United States Patent [19]

Pampouchidis et al.

[11] 4,282,128

[45] Aug. 4, 1981

[54] THERMOSETTING BINDERS FOR CATHODIC DEPOSITION IN ELECTRODEPOSITION PAINTS

[75] Inventors: Georgios Pampouchidis; Helmut Hönig, both of Graz, Austria

[73] Assignee: Vianova Kunstharz, A.G., Werndorf, Austria

[21] Appl. No.: 106,165

[22] Filed: Dec. 21, 1979

[30] Foreign Application Priority Data

Dec. 27, 1978 [AT] Austria ................................. 9280/78

[51] Int. Cl.$^3$ ...................... C08L 75/02; C08L 63/00
[52] U.S. Cl. .......................... 260/29.2 TN; 204/181 C; 260/18 EP; 260/18 TN; 260/29.2 EP; 525/454; 525/460; 528/73
[58] Field of Search ................ 260/29.2 TN, 29.7 EP, 260/18 EP, 18 TN; 204/181 C; 525/455, 454

[56] References Cited

U.S. PATENT DOCUMENTS

| | | |
|---|---|---|
| 3,922,253 | 11/1975 | Jerabek et al. ............... 260/29.2 TN |
| 3,939,126 | 2/1976 | Carder et al. ........................ 528/75 |
| 4,176,099 | 11/1979 | Pampouchidis et al. .... 260/29.2 TN |
| 4,179,425 | 12/1979 | Pampouchidis et al. .... 260/29.2 TN |

*Primary Examiner*—Theodore E. Pertilla
*Attorney, Agent, or Firm*—A. W. Breiner

[57] ABSTRACT

Process of producing, and binders water soluble upon neutralization with acids which are depositable at the cathode of an electrodeposition system and can be crosslinked through thermic polymerization without additional crosslinking components characterized in that (A) 1 mole of an isocyanate having the formula OCN—R—(NCO)$_n$, in which R is an aromatic, aliphatic or cycloaliphatic hydrocarbon radical and n is 1 or 2, is reacted at from 0°–50° C., with
 (a) from 0.1 to 0.5 moles, if n=1, or 0.1 to 1.0 moles, if n=2, of a tertiary dialkylalkanol amine, and subsequently with
 (b) from 0.5 to 0.9 moles, if n=1, or 1.0 to 1.9 moles, if n=2, of a compound carrying one free hydroxy group and 1–3 CH$_2$=CR$_1$ groups, where R$_1$=H or CH$_3$, and (B) the intermediate resulting from (A) carrying an average of 1 free isocyanate group is reacted at from 10°–100° C., with the hydroxy groups of an epoxy resin-/amine adduct until an isocyanate value of 0 is obtained, the quantities between the components being chosen in order that the final product, in 1000 molecular weight units, carries at least 0.5 chain end or side chain double bonds and at least 0.15 basic nitrogen atoms. The reaction proceeds in a single kettle to produce compounds having superior dispersibility and stability in water, and are easily applied as a binder.

13 Claims, No Drawings

THERMOSETTING BINDERS FOR CATHODIC DEPOSITION IN ELECTRODEPOSITION PAINTS

The present invention is directed to protective coatings, and more particularly to paint binders water soluble upon neutralization with acids, which are depositable at the cathode of an electrodeposition system and crosslink through thermic polymerization without additional crosslinking components.

DE-OS Nos. 27 07 405, 27 07 482, 27 55 538, 27 56 808, and AT-PS Nos. 343,769 and 346,989 disclose binders which crosslink through thermic polymerization and have application in cathodically depositable electrodeposition paints. The basic and/or polymerizable functions of the binder are introduced into the polymerization resins, polycondensation resins or polyaddition resins by means of basic and/or polymerizable monoisocyanate intermediate products. The coatings obtained with the described products in general satisfy the requirements for most practical applications. However, there are shortcomings with those systems regarding production technique and ease of application. For instance, the manufacture of the products in many cases calls for exact coordination of time periods in the production of the intermediates which often have a reduced storage stability, the use of a greater number of production units, and relatively long manufacturing times. In the application of the products, the dispersion capability, which is not optimal, is a defect not easily overcome and particularly prominent upon dilution of the material to bath tank concentration.

It has now been found that the disadvantages of the products now in use with respect to production of the binders and application can be overcome by using a mixed monoisocyanate intermediate carrying basic and polymerizable functions. It is surprising and contrary to existing technology that the preparation of such a mixed intermediate can be realized in a one-pot process without taking prohibitive precautionary steps. The present invention provides a process for preparing thermosetting binders for cathodically depositable electrodeposition paints by reaction of epoxy resin/amine adducts carrying hydroxyl groups, and optionally modified with mono- and/or dicarboxylic acids, with unsaturated and basic monoisocyanates in the presence of isocyanate inert solvents. The process is particularly characterized in that (A) 1 mole of an isocyanate with the general formula $OCN-R-(NCO)_n$, in which R is an aromatic, aliphatic or cycloaliphatic hydrocarbon radical, and n is 1 or 2, is reacted at from 0°–50° C., preferably 20°–30° C., with (a) 0.1 to 0.5, if n=1, or 0.1 to 1.0, if n=2, moles of a tertiary dialkylalkanol amine and subsequently, with (b) 0.5 to 0.9, if n=1, or 1.0 to 1.9, if n=2, moles of a compound carrying one free hydroxy group and 1–3 $CH_2=CR_1$ groups, where $R_1$=H or $CH_3$, and (B) the intermediate resulting from (A) carrying an average of 1 free isocyanate group is reacted at from 10°–100° C., preferably at from 40°–80° C., with the hydroxy groups of the epoxy resin/amine adduct until an isocyanate value of 0 is obtained, the quantities between the components being chosen in order that the final product, in 1000 molecular weight units, carries at least 0.5, preferably 0.5–2.5 chain end or side chain double bonds and at least 0.15, preferably 0.5–2.5 of basic nitrogen atoms.

The products prepared according to the present invention, in addition to convenience of production and ease of application, surprisingly show in the normal pH range for watersoluble binders, i.e., between about 4–9, a substantially improved water solubility over that of the products now used; and, moreover, the so-called "viscosity peak" normally observed in the dilution of water-soluble resins is present to a minor extent only.

Additionally, it was surprising that the binders prepared according to the invention show excellent storage stability over long periods upon neutralization with acids and dilution with water to a pH-value best suitable for application, between 5.0 and 7.0 and the technically interesting concentration range of 70 and 10 percent. Through this behavior, advantageous in respect to processing technique, the filling of electrodeposition installations of various types with the products can be effected without problem in the same manner when the material is replenished.

In the preparation of suitable isocyanate intermediates, it is essential that the weight ratios designated and the order of reaction steps be strictly observed. Upon simultaneous addition of components (a) and (b) and also by adding (b) before (a), the intermediates become highly viscous and present difficulties upon reaction with the base resin, leading to products which are hard to handle or gel.

Suitable isocyanates of the general formula $OCN-R-(NCO)_n$, where R is an aromatic, aliphatic or cycloaliphatic radical and n is 1 or 2, include aromatic isocyanates such as 2,4- or 2,6-toluene diisocyanate or the dimerization or trimerization products thereof, 4,4'-diphenylmethane diisocyanate; 4,4',4''-triphenylmethanetriisocyanate, trimethylolpropane-tris-tolueneisocyanate, tris-(4-isocyanatophenyl)-thiophosphate; cycloaliphatic isocyanates, such as isophoronediisocyanate; cyclohexane-1,4-diisocyanate; dimeryldiisocyanate, and aliphatic isocyanates such as trimethylhexamethylene-1,6-diisocyanate; tris-hexamethylene triisocyanate. Suitable tertiary dialkylalkanol amines (component (a)) are preferably dimethylethanol amine, diethylethanol amine, dimethylpropanol amine, diethylpropanol amine, their homologues and isomers. Suitable hydroxyl containing unsaturated compounds, i.e., compounds with 1 free hydroxy group and from 1 to 3 $CH_2=CR_1$ groups, where $R_1$=H or a methyl group, (component (b)), are in particular the hydroxy alkyl esters of acrylic acid or methacrylic acid, such as hydroxyethyl(meth)-acrylate, hydroxypropyl(meth)acrylate, their higher homologues or isomers, or tri-, tetrapropylene glycolmono(meth)acrylate, trimethylolpropane-di(meth)acrylate, pentaerythritol-tri(meth)-acrylate, trimethylolpropanediallyl ether and pentaerythritoltriallyl ether.

The preparation of the isocyanate intermediate is carried out in order that in a first reaction step the amine is reacted completely with the isocyanate at 0°–50° C., preferably 20°–30° C., and subsequently the unsaturated component (b) is reacted. Since both reactions are strongly exothermic, components (a) and (b) should be slowly added to the isocyanate.

The weight ratios between isocyanate and components (a) and (b) are chosen in order that the intermediate carries an average of one free isocyanate group. When using a diisocyanate as the starting material where n=1, 0.1–0.5 moles of the dialkylalkanolamine are used, whereas with a triisocyanate (n=2), from 0.1–1.0 moles of the amine are employed. The quantity of the unsaturated compound when n=1 ranges between 0.5 and 0.9 moles, and when n=2, between 1.0-1.9 moles.

The epoxy resins carrying basic groups, used in step (B) are obtained by reaction of the oxirane groups of di- or polyepoxy compounds with secondary amines at 60° to 160° C. Optionally, the oxirane groups may be partially reacted with monocarboxylic acids prior to the reaction with the amine. Another way of modifying the epoxy resins is by reacting 2 moles of a diepoxy compound with 1 mole of an aliphatic dicarboxylic acid and 2 moles of a secondary amine, at 100° to 160° C., either simultaneously or in separate reaction steps. Suitable epoxy compounds for use herein are the glycidyl ethers of phenols or phenol novolaks, glycidyl esters of aliphatic, aromatic or cycloaliphatic polycarboxylic acids, glycidyl ethers of aliphatic or cycloaliphatic diols or polyols. A detailed description can be found in A. M. Paquin, *Epoxidverbindungen und Epoxidharze*, Springer 1958. The preferred diepoxy compounds are the diglycidylethers of phenols, particularly reaction products of 4,4'-bis-(hydroxyphenyl)-propane (Bisphenol A) or its hydrated or alkyl or halogen substituted derivatives with epichlorohydrin.

The secondary amines used in the preparation of the epoxy resin/amine adducts include dialkyl amines, such as dimethylamine, diethylamine, their homologues or isomers, as well as cyclic amines such as ethylene imine, morpholine, etc. The preferred dialkanol amines are diethanolamine, dipropanolamine, dibutanolamine, and their homologues.

The monocarboxylic acids used for modification are preferably the long-chain oil fatty acids and their chemical transformation products. The dicarboxylic acids used may be saturated or unsaturated, including fumaric acid, malonic acid, succinic acid, glutonic acid, adipic acid, pimelic acid, suberic acid, azelaic acid, sebacic acid, tetradecane dicarboxylic acid and dimeric fatty acids.

Reaction step (B), i.e., the reaction of the epoxy resin/amine adduct with the isocyanate intermediate is carried out at from 10°-100° C., and preferably at from 40°-80° C., optionally in the presence of isocyanate inert solvents, until an NCO-value of 0 is obtained. The weight ratio between the components is chosen in order that in 1000 molecular weight units of the final product at least 0.5, preferably 0.5-2.5, basic nitrogen atoms are present and at least 0.5, preferably 0.5-2.5, of polymerizable double bonds are present.

The basic groups of the cationic components are neutralized with organic and/or inorganic acids, including formic acid, acetic acid, lactic acid, phosphoric acid, etc. The degree of neutralization depends from the individual properties of the binder. In general, sufficient acid is added to provide a pH-value of from 4-9, preferably 5-8, of the coating composition and which gives excellent dilutability or dispersing capacity. The concentration of the binder in water depends upon the parameters of application by electrodeposition and may range between 2 to 30 percent by weight, preferably 5 to 15 percent by weight. After deposition, the coating is cured at temperatures of from 130°-200° C., preferably 150°-170° C., for from about 5-30 minutes, and normally from about 10-25 minutes.

The following examples illustrate the invention without limiting its scope. All parts and percentages are by weight, unless otherwise stated.

Preparation Of Intermediates (A) Hydroxy Group Containing Components

In a reaction vessel equipped with stirrer, thermometer, inert gas supply and reflux condensor, an epoxy resin is diluted with a solvent in order that the final product has a concentration of 70%. Optionally, a mono- or dicarboxylic acid and the diethanolamine are charged first and the blend is carefully heated to 60°-90° C. while being stirred. The reaction is exothermic, the temperature rising to from about 120°-150° C. The reaction product is held while stirring for from about 1-3 hours at about 120°-150° C., optionally with intermittent cooling. The product is then cooled to about 50°-70° C.

TABLE 1

| Intermediate | Epoxy Resin (Ep. Equ.) | Solvent | Diethanolamine | Mono- or Dicarboxylic acid | Reaction Conditions |
|---|---|---|---|---|---|
| A 1 | 1100(+) (500-575) | Egac | 210 | — | 2h/140° C. |
| A 2 | 500(+) (230-250) | MIBK | 157.5 | 84 isononanoic acid | 3h/120° C. |
| A 3 | 500(+) (230-250) | CHX | 157.5 | 140 dehydrated castor oil fatty acid | 2h/140° C. |
| A 4 | 700(++) (190-200) | Egac | 262 | 280 dehydrated castor oil fatty acid | 2h/130° C. |
| A 5 | 800(+) (190-200) | Egac | 210 | 146 adipic acid | 2h/130° C. |
| A 6 | 500(+) (230-250) | CHX | 315 | 73 adipic acid | 2h/130° C. |
| A 7 | 1100(+) (500-575) | Egac | 210 | 318 TDDS | 2h/140° C. |

Ep.Equ. = epoxide equivalent
Egac = ethylglycolacetate
MIBK = methylisobutylketone
CHX = cyclohexanone
TDDS = tetradecanedicarboxylic acid
(+) = epoxy resin which is the reaction product of 4,4'bis(hydroxyphenyl)propane (Bisphenol A) with epichlorohydrin to provide the epoxy equivalent designated in parenthesis.
(++) = epoxy resin of the novolak-type (epoxy-functionality = 3.5)

(B) Mixed Monoisocyanate Intermediates

A reaction vessel equipped with stirrer, thermometer, addition funnel and reflux condensor is charged with 1 mole of the polyisocyanate, diluted with ethylglycolacetate in a quantity to give a final product with 60% concentration. After addition the vessel and contents are cooled to 10°-20° C., while stirring and preventing access of moisture. Then, while cooling and stirring, the tertiary dialkylalkanol amine is added over a period of 30 minutes; the reaction is exothermic and the temperature rises to 20°-35° C. Then, over an additional 30-minute period, the polymerizable hydroxy group containing compound is added, having been stabilized with 0.1% hydroquinone. The reaction product is ready to use.

TABLE 2

| Intermediate | 1 Mole Polyisocyanate | Mole/Amino Compound | Mole/Hydroxy Compound | Molecular Weight ca. |
|---|---|---|---|---|
| B 1 | TDI | 0.4 DMEA | 0.6 HEA | 279 |
| B 2 | TDI | 0.5 DEEA | 0.5 TMPDA | 373 |
| B 3 | IPDI | 0.3 DMEA | 0.7 HEM | 331 |
| B 4 | TPMT | 0.6 DEEA | 1.4 HEA | 600 |

TABLE 2-continued

| Inter-mediate | 1 Mole Polyiso-cyanate | Mole/Amino Compound | Mole/Hydroxy Compound | Molecular Weight ca. |
|---|---|---|---|---|
| B 5 | TPMT | 1.0 DMEA | 1.0 TMPDA | 698 |

TDI = toluene diisocyanate (available isomer blend)
IPDI = isophoronediisocyanate
TPMT = triphenylmethanetriisocyanate
DMEA = dimethylethanolamine
DEEA = diethylethanolamine
HEA = hydroxyethylacrylate
HEM = hydroxyethylmethacrylate
TMPDA = trimethylolpropanediacrylate

EXAMPLES 1-4

Hydroxyl component A is blended, at 50°-70° C., with the monoisocyanate intermediate, while stirring, within 5-15 minutes. The temperature of the exothermic reaction is controlled to prevent a rise above 80° C. After 3 hours at 70°-75° C., the batch is diluted with ethylglycol acetate to 60% and stabilized with 0.1% hydroquinone, calculated on total product, and discharged.

The quantities of components A and B in Table 3 are stated as solid resin content, i.e., as if being without added solvent.

TABLE 3

| Example | Component A | | Component B | | BN[+] | DB[++] |
|---|---|---|---|---|---|---|
| 1 | 1310 | A 1 | 836 | B 1 | 1.49 | 0.84 |
| 2 | 1310 | A 1 | 1120 | B 2 | 1.03 | 1.24 |
| 3 | 741 | A 2 | 697 | B 1 | 1.73 | 1.04 |
| 4 | 741 | A 2 | 746 | B 2 | 1.69 | 1.35 |
| 5 | 797 | A 3 | 746 | B 2 | 1.62 | 1.30 |
| 6 | 797 | A 3 | 662 | B 3 | 1.44 | 0.96 |
| 7 | 1242 | A 4 | 995 | B 3 | 1.52 | 0.94 |
| 8 | 1242 | A 4 | 1048 | B 5 | 1.75 | 1.31 |
| 9 | 1156 | A 5 | 976 | B 1 | 1.60 | 0.99 |
| 10 | 1156 | A 5 | 1200 | B 4 | 1.25 | 1.10 |
| 11 | 888 | A 6 | 995 | B 5 | 2.07 | 1.12 |
| 12 | 888 | A 6 | 1048 | B 5 | 2.33 | 1.55 |
| 13 | 1628 | A 7 | 1449 | B 2 | 1.30 | 1.30 |
| 14 | 1628 | A 7 | 1322 | B 3 | 1.08 | 0.95 |

[+]BN = base number defined as the average number of basic N-atoms in 1000 molecular weight units
[++]DB = double bond number defined as the average number of double bonds in 1000 molecular weight units

EVALUATION OF BINDERS OF EXAMPLES 1-14

100 g samples of the designated binder were blended with a neutralizing acid and, while stirring, made up to 1000 g with deionized water. The 10% solutions were deposited cataphoretically on steel panels. Deposition time was 60 seconds in all cases. The coated substrates were rinsed with deionized water and cured at elevated temperature. The resulting films had a film thickness of 13 to 17 μm.

The results are listed in Table 4.

TABLE 4

| Ex. | Neutralization | | | Deposition | | Tests | | |
|---|---|---|---|---|---|---|---|---|
| | Quantity[1] | Type[2] | pH[3] | Volt | Cure Min/°C. | Indentation[4] | Resistance [5] | [6] |
| 1 | 4.0 | E | 6.0 | 220 | 20/180 | 7.5 | 580 | 450 |
| 2 | 2.5 | A | 6.2 | 280 | 15/170 | 6.5 | 850 | 650 |
| 3 | 3.0 | A | 6.3 | 210 | 20/170 | 8.0 | 600 | 480 |
| 4 | 4.0 | E | 6.3 | 220 | 15/170 | 7.0 | 800 | 550 |
| 5 | 5.0 | M | 6.6 | 190 | 15/180 | 7.5 | 750 | 480 |
| 6 | 3.0 | A | 6.2 | 200 | 15/180 | 8.1 | 580 | 440 |
| 7 | 4.0 | E | 6.4 | 240 | 20/180 | 8.3 | 560 | 480 |
| 8 | 5.0 | M | 6.5 | 280 | 20/180 | 6.8 | 740 | 560 |
| 9 | 2.5 | A | 6.5 | 280 | 15/170 | 8.0 | 850 | 650 |
| 10 | 2.3 | A | 6.6 | 300 | 15/170 | 7.8 | 800 | 600 |
| 11 | 4.5 | E | 6.0 | 260 | 15/170 | 7.5 | 750 | 580 |
| 12 | 3.0 | A | 5.9 | 280 | 10/170 | 7.0 | 700 | 540 |
| 13 | 4.0 | E | 6.1 | 280 | 15/170 | 7.5 | 760 | 600 |
| 14 | 2.3 | A | 6.0 | 280 | 20/180 | 7.0 | 650 | 540 |

Key to Table 4
[1]quantity of acid in grams for each 100 g resin solids
[2]E: acetic acid; M: lactic acid; A: formic acid
[3]measured on a 10% aqueous solution
[4]Erichsen indentation DIN 53 156 (mm)
[5]hours, until rusting and blisters appear on water soak at 40° C.
[6]salt spray test ASTM B 117-64: 2 mm of corrosion at cross incision after the stated number of hours For the test, cleaned untreated steel panels were coated with a pigmented paint which contained 20 parts by weight of aluminum silicate pigment and 2 parts by weight of carbon black in 100 parts by weight of resin solids.

It is claimed:

1. Process for preparing thermosetting binders for cathodically depositable electrodeposition paints characterized in that (A) 1 mole of an isocyanate having the formula OCN—R—(NCO)$_n$, wherein R is an aromatic, aliphatic or cycloaliphatic hydrocarbon radical, and n is 1 or 2, is reacted at from 0°-50° C., with (a) 0.1-0.5, if n is 1, or 0.1-1.0, if n is 2, moles of a tertiary dialkylalkanol amine, and subsequently with (b) 0.5-0.9, if n is 1, or 1.0-1.9, if n is 2, moles of a monohydroxy compound with from 1-3 $CH_2=CR_1$ groups, wherein $R_1=H$ or $CH_3$, and selected from the groups consisting of monohydroxy esters of acrylic or methacrylic acid and an alkanol having from 1 to 4 hydroxy groups and monohydroxy ethers of allyl alcohol and an alkanol having from 3 to 4 hydroxy groups, and (B) reaction intermediate (A) carrying an average of 1 free isocyanate group is reacted at from 10°-100° C., with the hydroxy groups of a 1,2-epoxy resin/amine adduct until an isocyanate value of 0 is obtained; the quantities of reactants selected to provide a binder which, in 1000 molecular weight units, carries at least 0.5 chain end or side chain double bonds and at least 0.15 basic nitrogen atoms.

2. Process of claim 1 wherein the reaction between the said isocyanate and (a) and (b) is carried out at from 20°-30° C.

3. Process of claim 1 wherein the reaction intermediate (A) is reacted with the hydroxy groups of the epoxy resin/amine adduct at temperatures of from about 40°-80° C.

4. Process of claim 1 wherein the binder produced carries from 0.5-2.5 chain end or side chain double bonds, and from 0.5-2.5 basic nitrogen atoms per said 1000 molecular weight units.

5. Process of claim 1 including the step of neutralizing reaction product (B) in an aqueous medium with an organic acid to provide an aqueous solution of product (B).

6. Thermosetting binder for cathodically depositable electrodeposition paints comprising the reaction product obtained by heating at from about 10°-100° C. components (A) and (B) wherein component (A) is the reaction product obtained by reacting at from 0°–50° C. 1 mole of an isocyanate having the formula OC—N—R—(NCO)$_n$, wherein R is an aromatic, aliphatic or cycloaliphatic hydrocarbon radical, and n is 1 or 2, with (a) 0.1–0.5, if n is 1, or 0.1–1.0, if n is 2, moles of a tertiary dialkylalkanol amine, and subsequently with (b) 0.5–0.9, if n is 1, or 1.0–1.9, if n is 2, moles of a monohydroxy compound with from 1–3 $CH_2=CR_1$ groups, wherein $R_1=H$ or $CH_3$, and selected from the groups consisting of monohydroxy esters of acrylic or methacrylic acid and an alkanol having from 1 to 4 hydroxy groups and monohydroxy ethers of allyl alcohol and an alkanol having from 3 to 4 hydroxy groups to provide a product having 1 free isocyanate group, and component (B) is a 1,2-epoxy resin/amine adduct having isocyanate reactive hydroxyl groups, said heating of (A) and (B) being carried out until an isocyanate value of 0 is obtained, the quantities of reactants being selected to provide a binder which, in 1000 molecular weight units, carries at least 0.5 chain end or side chain double bonds and at least 0.15 basic nitrogen atoms.

7. The thermosetting binder of claim 6 wherein the reaction to provide component (A) is carried out at from 20°–30° C.

8. The thermosetting binder of claim 6 wherein the heating of components (A) and (B) is carried out at a temperature of from about 40°–80° C.

9. The thermosetting binder of claim 6 wherein the quantity of reactants is selected to provide a binder which in said 1000 molecular weight units carries from 0.5 to about 2.5 chain end or side chain double bonds and from 0.5 to about 2.5 basic nitrogen atoms.

10. The thermosetting binder of claim 6 wherein said compound carrying one free hydroxyl group and ethylenically unsaturated groups is a hydroxy alkyl ester of acrylic acid or methacrylic acid.

11. The thermosetting binder of claim 6 wherein said epoxy resin of said epoxy amine adduct is a diglycidylether of a phenol.

12. The thermosetting binder of claim 11 wherein the diglycidylether is the reaction product of 4,4'-bis(hydroxyphenyl)-propane and epichlorohydrin.

13. An aqueous solution comprising the thermosetting binder of claim 6 neutralized with an organic acid.

* * * * *